Aug. 10, 1937.  C. O. OLSSON ET AL  2,089,411
DOMESTIC STEAMER
Filed Jan. 11, 1935

C. O. Olsson
S. O. C. Kuhlemann
INVENTORS by Glascock Downing & Seebold
Attys.

Patented Aug. 10, 1937

2,089,411

UNITED STATES PATENT OFFICE 2,089,411

DOMESTIC STEAMER

Carl Oskar Olsson, Enskede, and Stig Ove Christian Kuhlemann, Stockholm, Sweden

Application January 11, 1935, Serial No. 1,410
In Sweden January 18, 1934

8 Claims. (Cl. 53—2)

Our present invention relates to the generation and utilization of superheated vapour, especially superheated steam.

The principal object of our invention is to provide an apparatus for generating and utilizing vapour, comprising generating vapour and utilizing said vapour at substantially atmospheric pressure for heating purposes such as boiling or steaming of foodstuffs, sterilization and similar purposes.

Another object of our invention is to provide an apparatus of the type described which comprises means for boiling a liquid so as to generate vapour thereof without substantially raising its pressure and utilizing said vapour for heating purposes at substantially atmospheric pressure.

A further object of our invention is to provide such means which comprise, in combination, a vapour generator, a vessel unhermetically closable to the atmosphere and a channel connecting said generator with said vessel, said channel being adapted to be exposed to the action of a source of heat of such an intensity as to be capable of heating the vapour flowing therethrough.

Still another object of our invention is to provide means of the type described having the form of a self-contained apparatus comprising an outer container, a vessel inserted, wholly or in part, in said outer container and a conduit connecting said container with said vessel and being adapted to be exposed to the action of a source of heat. The vessel is unhermetically closable to the atmosphere in such a manner that heat supplied to the channel and to the vapour formed in said container and flowing through the channel is utilized substantially exclusively to heat said vapour without raising its pressure to any considerable degree thereby permitting the vapour to be utilized in the vessel for heating purposes at substantially atmospheric pressure.

By the expression "hermetically closable to the atmosphere", as used above and in the following description and claims to define the space in which the heat treatment by means of the heated vapour takes place, we mean a space which is in more or less free communication with the atmosphere so as to permit the vapour to escape therefrom into the open air more or less freely. Consequently, no considerable superpressure can be built up in the space, but the pressure therein is equal or substantially equal to the atmospheric pressure.

Our invention will be more fully described according as the following description proceeds reference being had to the accompanying drawing in which some embodiments are illustrated by way of example. In the specification it is assumed for the sake of simplicity that the vapour consists of steam, but it should be observed that we do not restrict ourselves to the use of steam only but that other vapours may be used in certain cases.

In the drawing:—

Figure 1:
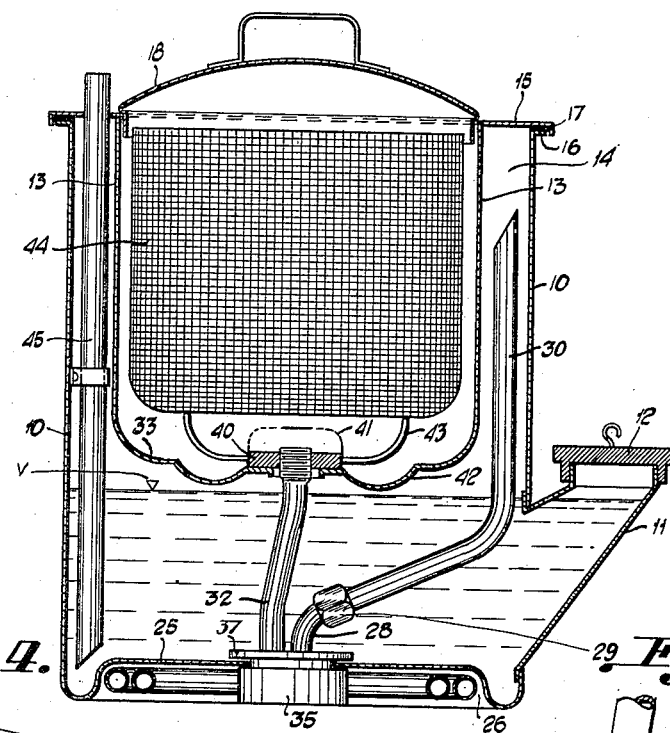
Fig. 1 is a vertical sectional view of an embodiment of an apparatus according to our invention.
Figure 4:
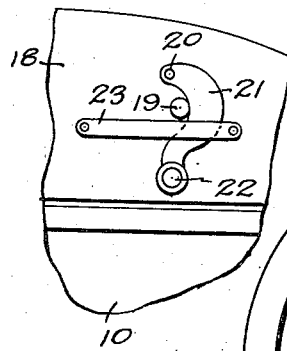
Fig. 4 is a side view on an enlarged scale of a portion of the lid of the apparatus particularly illustrating the lid closure means.

Referring more particularly to Figs. 1 to 4, inclusive, 10 is an outer container provided with a neck 11 adapted for filling the apparatus with water and covered by a lid 12, e. g., screwed on the neck or held in position thereon by frictional engagement. 13 is an inner vessel smaller than and arranged within the container 10 causing a space 14 to be formed between the two vessels. Provided at the upper end of the inner vessel 13 is an external rim 15 extending around said vessel and serving to support same on the upper edge 16 of the outer container 10. A packing 17 of suitable material may be interposed between said rim and edge. In operation the inner vessel 13 is closed by a lid 18 loosely placed thereon and provided with an opening 19 (see Fig. 4) which may be closed by a plate 21 turnably mounted as at 20 and provided with a knob 22, a strip 23 fixed to the lid holding said plate 21 into close engagement with the lid.

The bottom 25 of the outer container 10 is bent upwardly so as to form a pressed-up space 26 serving to take up a pipe coil 27 which in the embodiment shown extends in a plurality of turns around the bottom 25. A coupling 29 Fig. 3 connects the one end 28 of the pipe coil 27 with a pipe 30 extending upwardly within the container 10 and ending at a distance above the water level $v$ therein, whereas the other end 32 of the coil is passed through an opening in the bottom 33 of the inner vessel 13.

Figure 3:
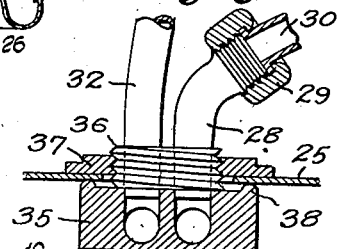
Fig. 3 is a partial sectional view on an enlarged scale of the connections of the heating pipe coil below the bottom of the apparatus with the outer and inner vessels thereof.
Figure 2:
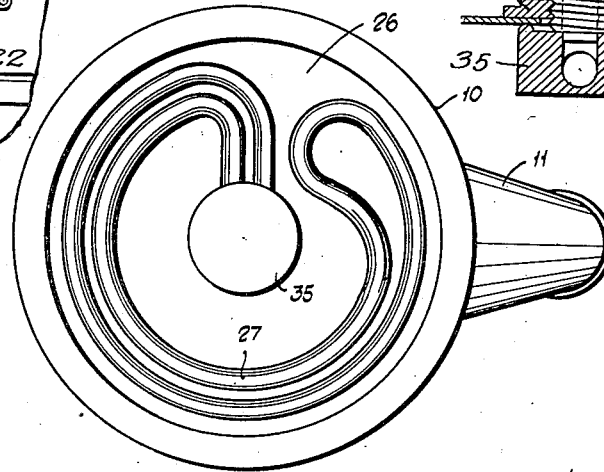
Fig. 2 is a view of said apparatus seen from the bottom.

The form of the two ends of the pipe coil 27 is clearly shown in Fig. 3. As seen the pipe ends are passed through holes in a disk 35 having a threaded upper portion 36 extending through an opening in the bottom 25 of the container 10.

A nut 37 engages this threaded portion 36 of the disk. By tightening said nut a ridge 38 provided on the disk 35 will be pressed into the material of the bottom 25 thus providing a fully reliable tight joint without using any packing.

At its upper end within the vessel 13 the pipe portion 32 is threaded and carries a nut 40 (see Fig. 1). By tightening the nut 40 the inner vessel 13 is pressed downwards causing the rim 15 to be pressed against the upper edge 16 of the outer container 10 so as to effect a tight joint at this place. In order to prevent foreign matters from entering the mouth of the pipe 32 protecting means may be provided above the nut 40, said means consisting e. g., of a wire gauze 41 or the like fixed over the mouth of the pipe 32 and serving simultaneously as a distributor for the steam entering the inner vessel 13. A depression 42 may be provided in the bottom 33 of the vessel 13 to collect water and any impurities.

Preferably, the nut 40 may be formed with arms 43 for supporting a basket 44 or the like in which the articles to be treated are introduced. The basket 44 may be of any suitable shape according to the purpose for which the apparatus is to be used, e. g., consist of network as indicated in Fig. 1.

Provided in the outer container 10 is a rising pipe 45 extending downwardly substantially to the bottom 25 and vertically upwards through the container. This pipe 45 serves as a safety device as will be more fully described later on.

The operation of the apparatus is as follows:

When the outer container 10 has been filled with water, e. g., to the level $v$, the apparatus is put on a source of heat of any kind, e. g., a gas burner. When the water is boiling the steam formed has no other way to escape than through pipe 30 and pipe coil 27 where it is exposed to the direct action of the source of heat and heated, the heated steam flowing then through pipe 32 into the inner vessel 13 where it will act on the articles to be treated which may be placed in the basket 44 above referred to. In the outer container 10 a slight superpressure will be set up corresponding mainly to the resistance to flow in the pipe coil 27, said superpressure being balanced by the liquid column in the rising pipe 45. Evidently, this superpressure may be varied by varying the length and cross sectional area of the pipe coil. At a temperature of the heated steam of about 160 to 170° C. the superpressure may amount to about 20 to 30 cm. water column.

If some hindrance or other arises against the free escape of the steam into the inner vessel 13, the pressure will, of course, rise in the outer container 10 causing water to be pressed out through the upper mouth of the rising pipe 45. By this means any risk of explosion is, consequently, eliminated.

The valve 19, 21 provided in the lid 18 of the inner vessel 13 should be kept more or less open as long as heat is supplied to the apparatus so as to allow the superheated steam to escape freely into the atmosphere. Consequently, the pressure within the vessel 13 does not substantially exceed atmospheric pressure, notwithstanding the fact that the lid 18 is more or less tightly fitted to the vessel. Thus, the heat supplied to the heating coil 27 is utilized substantially exclusively to increase the temperature of the steam without considerably increasing its pressure. When the operation is terminated and it is desired to cause the heat inherent in the apparatus to act on the articles during a more or less prolonged period of time, the opening 19 is closed by the valve plate 21 causing the vessel to be wholly closed. Then the temperature within the apparatus will sink very slowly rendering possible an effective utilization of the heat supplied.

When using a source of heat having an open flame it is of importance that the inner vessel 13 be protected from direct action of such a flame and thus be insulated thereagainst, this insulating action being in this embodiment effected by the water and steam in the outer container 10.

An arrangement or apparatus according to our invention may, as stated, be used for boiling, steaming, sterilizing or similar purposes. For instance it has been shown in practice that our new apparatus may at advantage be utilized for steaming certain foodstuffs, especially those requiring a relatively extended boiling time when boiled in usual manner, as for instance yellow peas, beans and similar vegetables, such foodstuffs requiring when steamed in an apparatus according to our invention only $\frac{1}{3}$ to $\frac{1}{10}$ of the usual time for being completely boiled. Further the apparatus has been found to be very suitable for effecting sterilization for which purpose it may at advantage be substituted for the expensive and complicated apparatus based on the autoclave principle hitherto used for this purpose.

The invention is not limited to the embodiments shown in the drawing which are to be considered as merely illustrative. Besides a gas burner or an electric heating device any other heating means at disposal, e. g., a stove or the like, may be used as source of heat. The heater proper may be of any type.

What we claim is:—

1. A self-contained apparatus for heat treatment by means of superheated vapour, comprising an outer liquid container adapted to permit a pressure slightly above atmospheric pressure to be set up therein, an inner vessel disposed within said container and being unhermetically closable to the atmosphere, and a pipe connecting the space of the container above the liquid level therein with the vessel, said pipe being adapted to be exposed to the action of a source of heat of such an intensity as to effect superheating of the vapour flowing therethrough, said pipe acting to facilitate the supporting of the vessel in spaced relation to the walls and bottom of the container, and means for detachably connecting the vessel to the pipe.

2. A self-contained apparatus for heat treatment by means of superheated vapour, comprising an outer liquid container adapted to permit a pressure slightly above atmospheric pressure to be set up therein, an inner vessel disposed within said container and being unhermetically closable to the atmosphere, and a pipe connecting the space of said container above the liquid level therein with said vessel, a part of said pipe being arranged outside said container so as to permit its exposure to the action of a source of heat of such an intensity as to effect superheating of the vapour flowing therethrough, one end portion of the pipe acting to facilitate the supporting of the vessel, and means for detachably fastening the vessel to the supporting portion of said pipe.

3. A self-contained apparatus for heat treatment by means of superheated vapour, comprising an outer container having a wall portion adapted to be exposed to the action of a source of heat for generating vapour from a liquid contained in said container, an inner vessel disposed within said container and being unhermetically closable to the atmosphere and having a rim engaging the top of the container to close the space between the container and the vessel, and a conduit adapted to conduct vapour from said container into said vessel, a part of said conduit being arranged outside said wall portion of the container, and means for detachably connecting the vessel to the conduit, said means also acting to clamp the rim of the vessel against the container.

4. A self-contained apparatus for heat treatment by means of superheated vapour, comprising a container having a bottom wall adapted to be heated to generate vapour from a liquid contained in the container, a vessel disposed within said container and being unhermetically closable to the atmosphere, said vessel being arranged in spaced relation to the side walls and bottom of the container and having a rim engaging the top of the container and closing the space therebetween and a conduit adapted to conduct vapour formed in the container into said vessel, said conduit extending with part of its length below the bottom of the container, and means for detachably connecting the vessel to the conduit, said means also acting to removably clamp the rim in tight engagement with the container.

5. A self-contained apparatus for heat treatment by means of superheated vapour, comprising a container for heating a liquid so as to generate vapour therefrom, a vessel disposed within said container, a rim on the top of the vessel for engagement with the top of the container and closing the space between the vessel and the top of the container, a conduit connecting said container with said vessel and being adapted to be exposed to the action of a source of heat of such an intensity as to effect superheating of the vapour flowing therethrough, means for detachably connecting the vessel to the conduit, said means being adjustable relative to the conduit in order to effect a tightening of the lid relative to the container and means to cause vapour formed in the container exclusively to flow through said conduit into said vessel.

6. A self-contained apparatus for heat treatment by means of superheated vapour, comprising a container adapted to be heated for generating vapour from a liquid contained therein, a vessel disposed within said container and having an opening to the atmosphere, a lid for covering said opening, said lid having a closable outlet, and a conduit adapted to conduct vapour generated in the container into said vessel, a part of said conduit being adapted to be exposed to the action of a source of heat of such an intensity as to effect superheating of the vapour flowing therethrough, means for detachably connecting the vessel to the conduit, said means also acting to maintain the vessel rigid with respect to the container.

7. A self-contained apparatus for heat treatment by means of superheated vapour, comprising a container adapted to be heated for generating vapour from a liquid contained therein, an upper opening in said container, a separate vessel extending into said opening and having an external rim adapted to close the opening, and a conduit adapted to conduct vapour formed in the container into said vessel and to be exposed to a source of heat of such an intensity as to effect superheating of the vapour flowing therethrough, means for detachably connecting the vessel to the conduit, said means and conduit facilitating the supporting of the vessel within the container.

8. A self-contained apparatus for heat treatment by means of superheated vapour, comprising a container adapted to be heated for generating vapour from a liquid contained therein, an upper opening in said container, a separate vessel extending through said opening and having an external rim resting on the edge of the opening so as to close same, a conduit connecting the vapour space of the container with said vessel and adapted to be exposed to the action of a source of heat of such an intensity as to effect superheating of the vapour flowing therethrough, and a releasable coupling connecting said vessel and said pipe, said coupling being adapted on being tightened to press said rim against the edge of said opening so as to effect a tight joint therebetween.

CARL OSKAR OLSSON.
STIG OVE CHRISTIAN KUHLEMANN.